US005402158A

United States Patent [19]

Larson

[11] Patent Number: 5,402,158

[45] Date of Patent: Mar. 28, 1995

[54] METHOD FOR IMPROVING THE PRINTING QUALITY AND REPETITION ACCURACY OF ELECTROGRAPHIC PRINTERS AND A DEVICE FOR ACCOMPLISHING THE METHOD

[75] Inventor: Ove Larson, Vastra Frolunga, Sweden

[73] Assignee: Array Printers AB, Molndal, Sweden

[21] Appl. No.: 60,097

[22] Filed: May 10, 1993

Related U.S. Application Data

[63] Continuation-in-part of Ser. No. 781,265, Dec. 6, 1991, Pat. No. 5,235,354.

[30] Foreign Application Priority Data

Jun. 7, 1989 [SE] Sweden ................................ 8902090

[51] Int. Cl.$^6$ ................................ G01D 15/06
[52] U.S. Cl. ................................ 347/151; 342/128
[58] Field of Search ................................ 346/159

[56] References Cited

U.S. PATENT DOCUMENTS 4,491,855 1/1985 Fujii et al. ........................ 346/159
5,296,879 3/1994 Kagayama ........................ 346/159 X

*Primary Examiner*—George H. Miller, Jr.
*Attorney, Agent, or Firm*—Ostrolenk, Faber, Gerb & Soffen

[57] ABSTRACT

A latent electrical charge pattern of electrical signals is produced by an electrode matrix. Apertures between the electrodes are opened and closed, respectively, to expose electric fields for the attraction of pigment particles of toner against an information carrier. The electrical charge pattern electrostatically controls the transmission of electrical fields through the apertures of the matrix to attract particles of toner against the information carrier. The apertures are opened and closed by generating electrostatic fields between the electrode layer, particle supply and backing electrode. Each electrode is arranged on a carrier to completely surround one aperture and is individually connected to a voltage source to supply the electrical signals.

20 Claims, 3 Drawing Sheets

METHOD FOR IMPROVING THE PRINTING QUALITY AND REPETITION ACCURACY OF ELECTROGRAPHIC PRINTERS AND A DEVICE FOR ACCOMPLISHING THE METHOD

This is a continuation-in-part of application Ser. No. 07/781,265, filed Dec. 6, 1991, U.S. Pat. No. 5,235,354.

BACKGROUND OF THE INVENTION

1. Field of the Invention

The invention relates to a method and device for improving the printing quality and the repetition accuracy of electrographical printers, in which a latent electric charge pattern of electrical signals is produced by means of an electrode matrix or the like, which opens and closes passages or apertures respectively between electrodes for exposing electrical fields for the attraction of pigment particles against an information carrier. Each electrode of the matrix is arranged on a carrier to completely surround one aperture of the matrix.

2. Description of the Prior Art

International patent application PCT/SE88/00653 discloses a method for developing pictures and text with pigment particles on an information carrier directly from computer generated signals, without the need for these signals to be intermediately stored for temporary conversion to light energy, which is necessary in photo conductive printers, e.g., laser printers. These problems have been solved by bringing the information carrier into electrical cooperation with at least a screen or preferably a lattice-shaped electrode matrix, which through control in accordance with the configuration of the desired pattern, the apertures of the matrix, which is galvanically connected to a voltage source, are at least partly opened and closed. An electric field is exposed through the open apertures for the attraction of the pigment particles against the information carrier.

This method, herein referred to as the EMS concept and as described in the above-mentioned patent application, may result in produced print which does not have high quality, particularly with repeated and continuous use.

The EMS concept refers to electrode matrices in which apertures or meshes in the matrix are defined and separated by simple electrodes, wherein the potential of every single electrode substantially influences the characteristics of the electric field on the pigment particles symmetrically in apertures adjoining the electrodes. This results in the attraction of pigment particles (herein called toner), not only in the mesh, which is surrounded by electrodes and the potential of which is intended to completely or partly open the mesh (herein called "black" voltage), but also in the exposed apertures of adjacent meshes. In electrode matrices with several mesh lines, meshes surrounded by simple electrodes will develop full-dots with intended extension and position, as well as half- and quarter-dots surrounding the full-dots. This results in an unsatisfactory edge definition and in certain cases a "blur" on the printed page. It is possible to change the potential of the adjacent electrodes, which are intended to close the apertures in the adjacent meshes (called "white" voltage) and reduce the problem of the undesired half- and quarter-dots, by skew setting the abovementioned symmetrical influence on the electrical field. This, however, leads to a potential difference between electrodes with "white" voltage and electrodes with "black" voltage (herein called contrast voltage), which in turn increases the manufacturing costs for the control electronics, as well as the electrode matrix.

The problems stated above are not limited to the EMS concept, but are also present wholly or partially in several electrographic printer concepts, where passage of toner is created in an electrical manner.

Common to all problems described here, another drawback of the known technique is that the printing quality, and thereby the readability, is influenced negatively resulting in reduced competitiveness and lower consumer value.

SUMMARY OF THE INVENTION

The present invention overcomes the above deficiencies of the prior art by providing a device and method which allows the EMS and other electrographic printer concepts to produce high quality prints with good readability, even when the device operates continuously without maintenance and service. These problems have been solved by electrostatically shielding the electrodes of the electrode matrix in the area about one or several open apertures from the closed apertures.

According to the invention the method of improving the printing quality and repetition accuracy of an electrographical printer in which a latent electrical charge pattern of electrical signals is produced in a unit including an electrode matrix having apertures and electrodes arranged between a particle supply and a backing electrode, comprises the steps of producing an electrical charge pattern by supplying a pattern of electrical signals to the electrodes forming the matrix. The electrical charge pattern electrostatically controls the transmission of electrical fields through the apertures of the matrix to attract particles of toner against an information carrier. The apertures are opened and closed by generating electrostatic fields between the electrode layer, particle supply and backing electrode. Each electrode is arranged on a carrier to completely surround one aperture and is individually connected to a voltage source to supply the electrical signals.

Other features and advantages of the present invention will become apparent from the following description of the invention which refers to the accompanying drawings.

DESCRIPTION OF THE PREFERRED EMBODIMENTS

Figure 1:
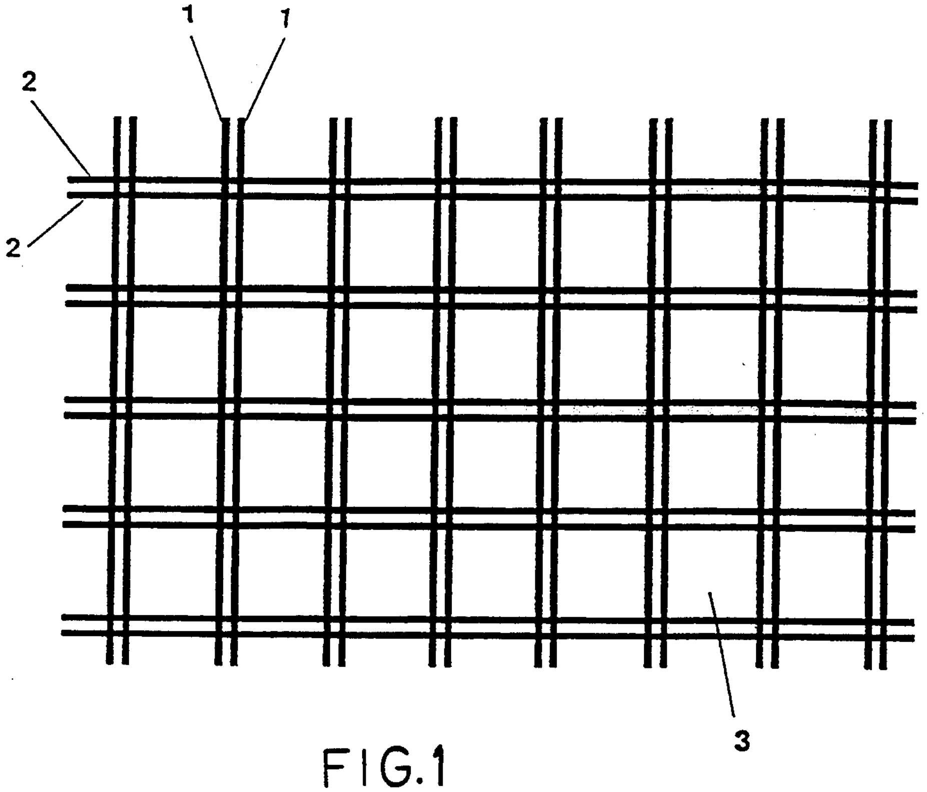
FIG. 1 is a cross-section of an electrode matrix, the meshes of which are defined with double electrodes.

In the drawings the reference numeral 1 designates an electrode, the extension of which is substantially parallel to the direction of movement of the paper. A second electrode 2, called a transversal electrode, is located in the same electrode matrix. The extension of electrode 2 is substantially traverse to the direction of the movement of the paper. Reference numeral 3 designates one of the many apertures or meshes, between the electrodes 1, 2, through which transport of toner takes place during development. Numeral 7 designates an information carrier, e.g., a sheet of paper. Equipotential lines 8*a,* 8*b* of an electrical field are disposed between the carrier 7 and a developer roller 9, for transport of pigment particles 11 (toner) from a container (not shown) in the proximity of the electrode matrix. Numeral 10 designates a backing electrode. Numeral 12 designates a carrier for the electrode matrix and/or its pattern of connecting conductors and electric resistors 13 (FIG. 4).

By applying several parallel electrodes 1, 2, with more than one electrode surrounding every mesh, the cross-coupling or crosswalk between two adjacent meshes 3 will be substantially reduced, since every conductor acts like a shield for electrostatic field lines. FIG. 1 shows an electrode matrix with double electrodes, 1, 2 extending in both electrode directions.

Figure 2:
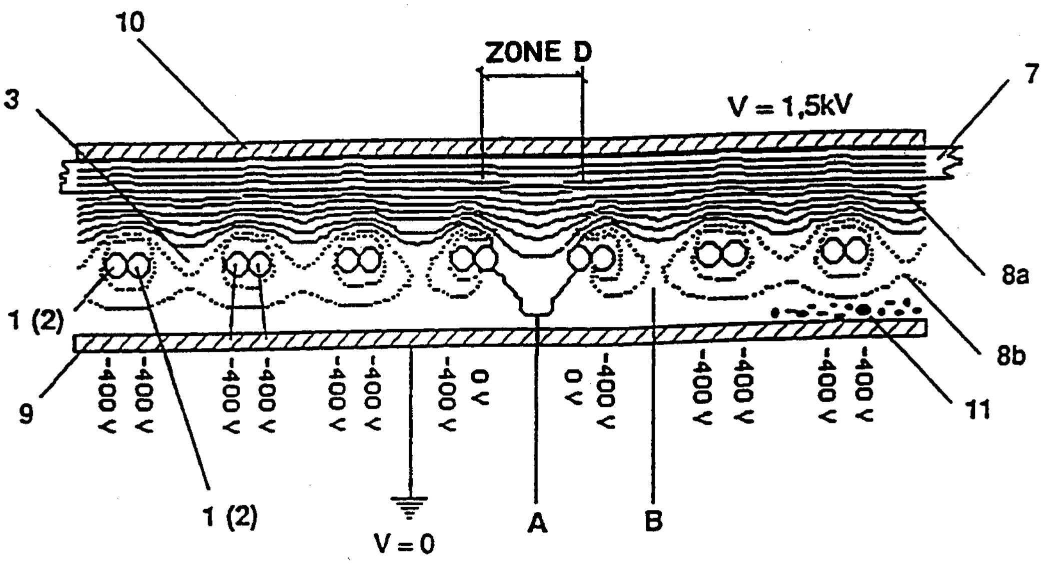
FIG. 2 shows the position and form of the equipotential lines in a two-dimensional lateral view of the electrode matrix according to FIG. 1 and the electrode field produced by a certain voltage setting of the electrode matrix.

The appearance of the electric field can be illustrated by equipotential lines 8*a,* 8*b.* FIG. 2 gives an example of this calculated by a numerical method (the finite element method). In FIG. 2, the equipotential lines, which represent a potential and have in relation to the charge of the toner particles an "attracting" influence on the toner, have been marked with solid lines 8*a.* Further equipotential lines, which represent a potential and which have in relation to the charge of the toner particles a "repelling" influence on the toner, have been marked with dashed lines 8*b.* The toner particles 11, which for the sake of clarity have been marked only in the right part of the picture in this example, are negatively charged. All electrodes, except for two, have a "white" voltage of −400 V. Between the two remaining electrodes, which have a "black" voltage of 0 V, a dot is intended to be produced in zone D on the paper 7. FIG. 2 shows clearly that the earlier mentioned and undesired crosstalk which is present in single-wired electrode matrices is no longer troublesome. At A in FIG. 2, where developing is intended to take place, equipotential lines 8*a* penetrate downwardly through the mesh 3 and will thereby increase the field to the extent necessary to lift the toner from developing roller 9. However, at B, where no development is intended, the lines 8*a* have been "forced" up in a direction away from the toner particles 11 and "substituted" by "blocking" equipotential lines 8*b.* The appearance and form of the equipotential lines are the same for the process in the mesh located to the right of mesh B in FIG. 2.

Figure 3:
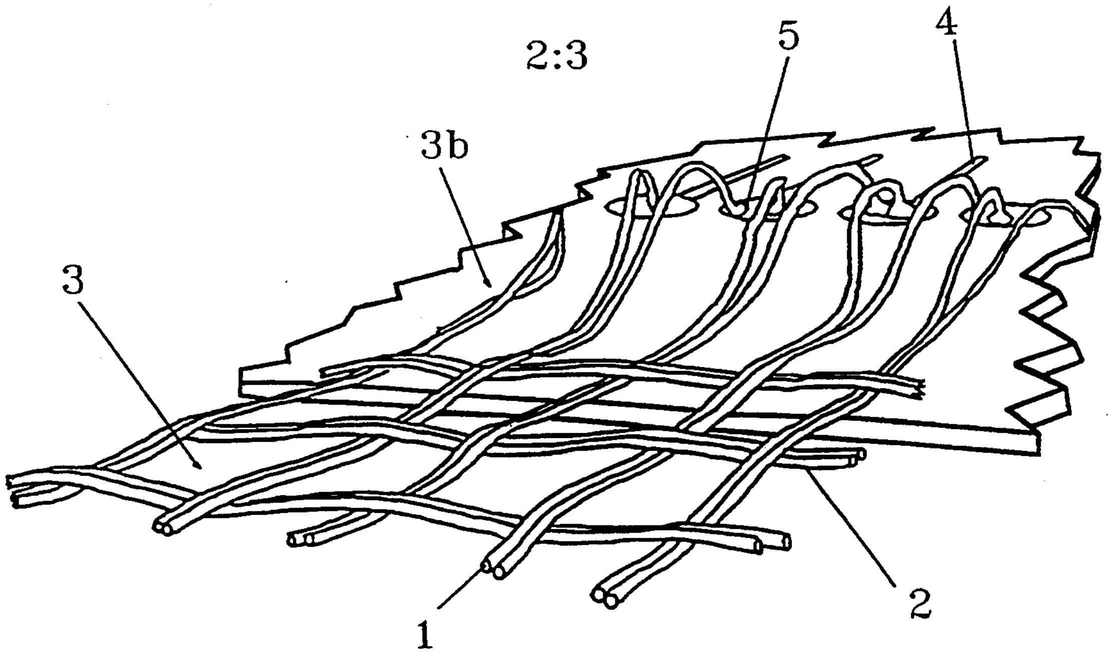
FIG. 3 is a perspective view of a woven net with double electrodes.
Figure 4:
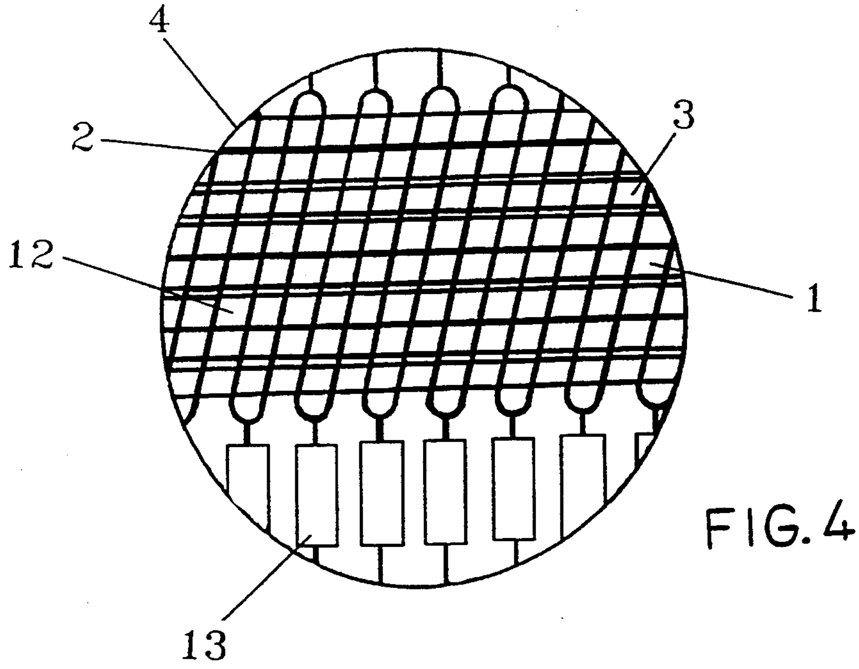
FIG. 4 shows an electrode matrix with double electrodes produced as a conductor pattern on a carrier.

FIGS. 3 and 4 show examples of devices according to the invention. FIG. 3 is a perspective view of a woven net of double electrodes 1, 2. Numerals 4 and 5 designate a conductive strip and the location at which the electrode is joined to the strip, respectively. In FIG. 4, a carrier 12 for the matrix of electrodes is connected with electrical resistors 13.

FIG. 4 shows electrodes 1 arranged as conductive patterns on carrier 12 in one direction surrounding an oblong aperture. Double electrodes 2 are arranged in a second direction, thereby producing smaller apertures.

Figure 5:
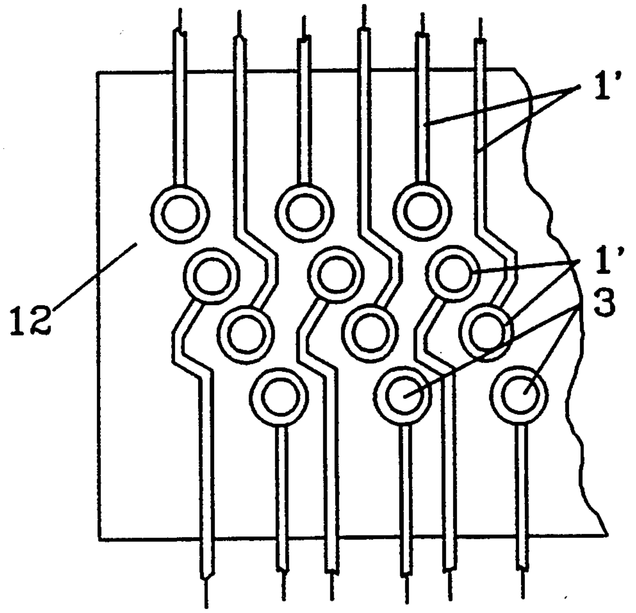
FIGS. 5 and 6 illustrate two other types of electrode matrices.

FIG. 5 shows an electrode matrix similar to the one shown in FIG. 4. The electrodes 1 and 2 of each aperture 3 are substituted by a ring shaped electrode 1′. Each aperture 3 is completely surrounded by one electrode. The electrodes 1′ are arranged on or included in carrier 12, which preferably consists of a flexible material. When an electrode 1′ is connected to a voltage for closing an aperture 3, electric fields are produced, which reach the backing electrode and the particle carrier, shutting out the attraction field produced between the backing electrode and the particle carrier.

Figure 6:
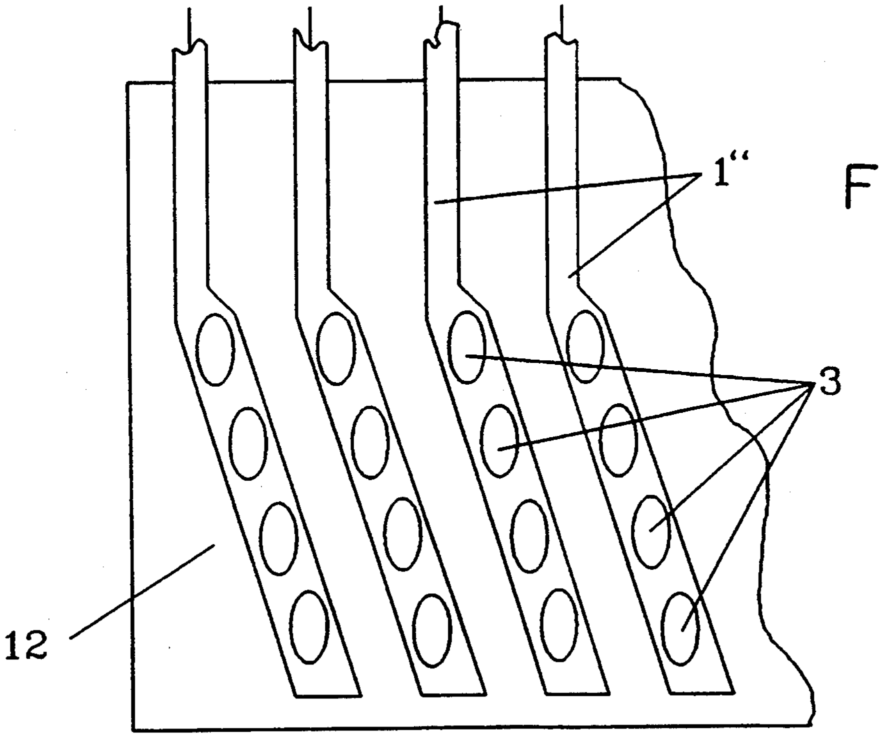

Electrodes shown in FIG. 6 are similar to the ones shown in FIG. 5, but the apertures are in a column surrounded by one electrode 1″.

Although the present invention has been described in relation to particular embodiments thereof, many other variations and modifications and other uses will become apparent to those skilled in the art. Thus, it is possible to apply the invention in other developing and pigment particle systems, e.g., monocomponent toner with carrier. Parts of the invention are also useful when the electrode matrix is placed behind the paper in a way that is described in PCT/SE88/00653. It is preferred, therefore, that the present invention be limited not by the specific disclosure herein, but only by the appended claims.

What is claimed is:

1. A method of improving printing quality and repetition accuracy of an electrographical printer in which a latent electrical charge pattern of electrical signals is produced in a unit including an electrode matrix having apertures and electrodes, the matrix being arranged between a toner particle supply and a backing electrode, the method comprising the steps of:

producing the electrical charge pattern by supplying a pattern of electrical signals to electrodes forming the matrix, the electrical charge pattern electrostatically controlling the transmission of electrical fields through the apertures of the matrix for controlling flow of toner particles through the apertures and onto an information carrier;

arranging each electrode of the electrode matrix on a carrier so that each electrode completely surrounds at least one aperture, each electrode being individually connectable to a voltage source supplying the electrical signals;

attracting toner particles through at least one of the apertures by generating a single electrostatic field between the particle supply and the backing electrode; and preventing toner particles from passing through the apertures by generating electrostatic fields between the electrode matrix and the backing electrode and between the electrode matrix and the toner supply.

2. The method of claim 1, wherein the step of attracting toner particles through at least one of the apertures includes the step of opening at least one of the apertures by not applying a charge to the electrodes surrounding said at least one of the apertures.

3. The method of claim 1, wherein the electrostatic fields generated in the step of preventing toner particles from passing through the apertures close at least one of the apertures so as to prevent toner particles from moving through said at least one of the apertures.

4. The method of claim 1, wherein said step of arranging each electrode of the electrode matrix includes the step of arranging a plurality of adjacent double electrodes in a lattice-shaped pattern.

5. The method of claim 1, wherein said step of arranging each electrode of the electrode matrix includes the step of arranging each of the plurality of apertures in columns so that each electrode surrounds one column of apertures.

6. The method of claim 1, wherein said step of arranging each electrode of the electrode matrix includes the step of arranging each electrode so that each aperture is surrounded by only one electrode.

7. A device for improving the printing quality and repetition accuracy of an electrographical printer including a toner particle carrier having a toner particle supply located thereon and a backing electrode, the device comprising:

an electrode matrix including a carrier having a plurality of electrodes and apertures, each aperture being completely surrounded by at least one electrode;

means for producing an electrical charge pattern by supplying a pattern of electrical signals to the electrodes forming the matrix, the electrical charge pattern being electrostatically arranged to control the transmission of electrical fields through the apertures for controlling flow of toner particles through the electrode matrix onto an information carrier arranged between the particle supply and the backing electrode, said means for producing an electrical charge pattern including:

means for attracting toner particles through at least one of the apertures by generating a single electrostatic field between the particle carrier and the backing electrode; and means for preventing toner particles from moving through the apertures by generating electrostatic fields between the backing electrode and the electrode matrix and between the electrode matrix and the particle carrier.

8. The device of claim 7, further comprising means for connecting the electrodes to the same or different voltages.

9. The device of claim 7, wherein said plurality of apertures are arranged in columns and each electrode surrounds one column of apertures.

10. The device of claim 7, wherein said means for attracting toner particles through at least one of the apertures includes means for opening at least one of the apertures by not applying a charge to the electrodes surrounding said at least one of the apertures.

11. The device of claim 7, wherein the electrostatic fields generated by said means for preventing toner particles from passing through the apertures close at least one of the apertures so as to prevent toner particles from moving through said at least one of the apertures.

12. The device of claim 7, wherein said electrode matrix comprises a plurality of adjacent double electrodes arranged in a lattice-shaped pattern and each of said adjacent double electrodes is individually connectable to a separate voltage source supplying electrical signals.

13. An electrographic printer comprising:

a toner particle supply;

a back electrode;

a control electrode for controlling a flow of toner particles from said toner particle supply to a recording medium located between the toner particle supply and the back electrode; and a power supply for applying a charge to said back electrode to create a single electrostatic field between the toner particle supply and the back electrode, the single electrostatic field being the only attractive force for attracting the toner particles from the toner particle supply toward the back electrode through the control electrode.

14. The electrographic printer of claim 13, wherein the control electrode comprises an electrode matrix including a plurality of electrodes and apertures, each electrode surrounding at least one aperture.

15. The electrographic printer of claim 14, wherein the control electrode and the power supply cooperate to allow toner particles to flow through at least one of the apertures when no charge is applied to the electrodes surrounding said one of the apertures and to prevent toner particles from flowing through at least one of the apertures when a charge is applied to the electrodes surrounding said one of the apertures.

16. The electrographic printer of claim 14, wherein each aperture is completely surrounded by only one electrode and each of the electrodes is individually connectable to a voltage source.

17. The electrographic printer of claim 14, wherein said plurality of apertures are arranged in columns and each electrode surrounds one column of apertures.

18. The apparatus of claim 13, further comprising a developer roll and wherein said toner particle supply is located on said developer roller.

19. The apparatus of claim 13, wherein said control electrode comprises an electrode matrix formed by a plurality of adjacent double electrodes arranged in a lattice-shaped pattern.

20. The apparatus of claim 19, wherein each of said adjacent double electrodes is individually connectable to said power supply.

* * * * *